United States Patent
Pasternak

(10) Patent No.: US 8,683,440 B2
(45) Date of Patent: Mar. 25, 2014

(54) PERFORMING DYNAMIC SOFTWARE TESTING BASED ON TEST RESULT INFORMATION RETRIEVED IN RUNTIME USING TEST RESULT ENTITY

(75) Inventor: Michael Pasternak, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 867 days.

(21) Appl. No.: 12/789,228

(22) Filed: May 27, 2010

(65) Prior Publication Data

US 2011/0296383 A1 Dec. 1, 2011

(51) Int. Cl.
*G06F 9/44* (2006.01)
*G06F 11/00* (2006.01)

(52) U.S. Cl.
USPC .................... 717/124; 717/125; 714/38.1

(58) Field of Classification Search
None
See application file for complete search history.

(56) References Cited

U.S. PATENT DOCUMENTS

| | | | |
|---|---|---|---|
| 7,127,641 B1 * | 10/2006 | Anderson | 714/38.1 |
| 7,367,025 B1 | 4/2008 | Nikolov et al. | |
| 7,398,469 B2 | 7/2008 | Kisamore et al. | |
| 7,594,219 B2 * | 9/2009 | Ramachandran et al. | 717/124 |
| 7,613,953 B2 * | 11/2009 | Voruganti | 714/38.1 |
| 7,890,806 B2 * | 2/2011 | Kwong et al. | 717/124 |
| 7,937,625 B2 * | 5/2011 | Calinoiu et al. | 714/38.1 |
| 8,276,123 B1 * | 9/2012 | Deng et al. | 717/125 |
| 8,276,126 B2 * | 9/2012 | Farnham et al. | 717/131 |
| 8,296,734 B2 * | 10/2012 | Geppert et al. | 717/124 |
| 2004/0133881 A1 * | 7/2004 | Chamberlain et al. | 717/125 |
| 2005/0204343 A1 | 9/2005 | Kisamore et al. | |
| 2006/0041864 A1 * | 2/2006 | Holloway et al. | 717/124 |
| 2006/0150188 A1 | 7/2006 | Roman et al. | |
| 2008/0040706 A1 * | 2/2008 | Blancha et al. | 717/124 |
| 2008/0109790 A1 * | 5/2008 | Farnham et al. | 717/128 |
| 2008/0127101 A1 * | 5/2008 | Anafi et al. | 717/125 |
| 2008/0209413 A1 | 8/2008 | Kakumani et al. | |
| 2008/0222454 A1 | 9/2008 | Kelso | |
| 2008/0306752 A1 * | 12/2008 | Wagner et al. | 705/1 |
| 2009/0199160 A1 | 8/2009 | Vaitheeswaran et al. | |

OTHER PUBLICATIONS

U.S. Appl. No. 11/388,445, Probabilistic System for Identifying Software Development Regressions, filed Mar. 24, 2006, 21 pages.*
Lucia et al. Recovering Traceability Links in Software Artifact Management Systems using Information Retrieval Methods. ACM Transactions on Software Engineering and Methodology (TOSEM), vol. 16, Issue 4, Sep. 2007. Retrieved on [Oct. 28, 2013], Retrieved from the Internet: URL<http://dl.acm.org/citation.cfm?id=1276934>.*

(Continued)

*Primary Examiner* — Thuy Dao
*Assistant Examiner* — Cheneca Smith
(74) *Attorney, Agent, or Firm* — Lowenstein Sandler LLP

(57) ABSTRACT

A mechanism for performing dynamic software testing on a computer system based on test result information retrieved in runtime using test result entity. A method of embodiments of the invention includes causing a test execution script to run a first test to test a first component, and the test execution script is supported by a script execution platform on a computer system, and the first component depends on a second component. The method further includes retrieving, in runtime, testing information relating to the second component from a database, if the first test produces unsatisfactory results relating to performance of the first component, and causing, in runtime, the test execution script to run a second test to test the second component.

15 Claims, 11 Drawing Sheets

(56) References Cited

OTHER PUBLICATIONS

Canfora et al.Fine Grained Indexing of Software Repositories to Support Impact Analysis. Proceedings of the 2006 international workshop on Mining software repositories, 2006, pp. 105-111, Retrieved on [Oct. 28, 2013] Retrieved from the Internet: URL<http://dl.acm.org/citation.cfm?id=1138009>.*

USPTO, Office Action for U.S. Appl. No. 12/789,248 mailed Jun. 20, 2012.

USPTO, Final Office Action for U.S. Appl. No. 12/789,248 mailed Jan. 15, 2013.

USPTO, Advisory Action for U.S. Appl. No. 12/789,248 mailed Mar. 22, 2013.

USPTO, Office Action for U.S. Appl. No. 12/789,199 mailed Oct. 11, 2012.

USPTO, Final Office Action for U.S. Appl. No. 12/789,199 mailed Jan. 29, 2013.

USPTO, Advisory Action for U.S. Appl. No. 12/789,248 mailed Apr. 2, 2013.

* cited by examiner

Get-TestsByBuildAndRevision -Build -Revision                              352

| | |
|---|---|
| Example: $r = Get-TestsByBuildAndRevision -Build "sp145" -Revision 29954 | |
| Where $r[0] is: | |
| Id | : -1 |
| TestId | : 113 |
| Name | : Some_Benchmark_v1 |
| Active | : True |
| BaseTestName | : Some_Benchmark |
| ScriptName | : Some_Benchmark |
| ScriptLocation | : \\server\script_location |
| TestParams | : conf_param1=x, conf_param2=y, conf_param3=z ... |
| Build | : sp145 |
| Revision | : 29954 |
| Version | : -1 |
| Failed | : 0 |
| Passed | : 3 |
| Executed | : 3 |
| Status | : ExecutedOnThisBuild |
| ExecutionInformation | : RedHat.Automation.Framework.ExecutionInfo |

FIG. 3B

Get-TestsThatNotRanAtBuildAndRevision -Build -Revision           354

Example: $nr = Get-TestsThatNotRanAtBuildAndRevision -Build "sp145" -Revision 29954

Where $nr[1] is:

| | |
|---|---|
| Id | : -1 |
| TestId | : 147 |
| Name | : Some_Benchmark_v1 |
| Active | : True |
| BaseTestName | : Some_Benchmark |
| ScriptName | : Some_Benchmark |
| ScriptLocation | : \\server\script_location |
| TestParams | : conf_param1=x conf_param2=y, conf_param3=z..., |
| Build | : -1 |
| Revision | : -1 |
| Version | : -1 |
| Failed | : 130 |
| Passed | : 8 |
| Executed | : 138 |
| Status | : NotExecutedOnThisBuild |
| ExecutionInformation | : Redhat.Automation.Framework.ExecutionInfo |

FIG. 3B (cont.)

Select-Test -name -id -build -revision                                                 356

Example:

$TestResult = Select-TestResult -name "Some_Benchmark*" -build "sp145" -revision 29954 | ? {$_.StartTime -like "6/9/2009*" -and $_.Status -like "Failed"]

Or $TestResult = Select-TestResult =id 26629 -build "sp145" -revision 29954

Where $TestResult is:

```
Id                    : 26629
TestId                : 116
Active                : True
Name                  : Some_Benchmark_v1
BaseTestName          : Some_Benchmark
ScriptName            : Some_Benchmark
ScriptLocation        : \\server\script_location
StartTime             : 6/9/2009 3:52:33 PM
EndTime               : 1/1/0001 12:00:00 AM
Status                : Failed
RunListId             : -1
ServerId              : 1
Iterations            : 28
ResultFile            :
TestParams            : conf_param1=x, conf_param2=y, conf_param3=z ...

Build                 : sp145
Revision              : 29954
Version               : 4.1
LogDir                :
/logs/silver/Some_Benchmark_06_09_2009_14_50_40/consoleLog_Some_Benchmark_
silver_06_09_2009_14_50_41.txt
DbStat                : 512
ExecutionInformation  : RedHat.Automation.Framework.ExecutionInfo
AncestorId            : -1
```

FIG. 3B (cont.)

Select-Test -AncestorId                                              ⎰ 358

1. $pearent = Select-TestResult -Id 39290

$pearent is:

| | |
|---|---|
| Id | : 39290 |
| TestId | : 162 |
| Active | : True |
| Name | : Some_Benchmark_v1 |
| BaseTestName | : Some_Benchmark |
| ScriptName | : Some_Benchmark |
| ScriptLocation | : \\server\script_location |
| StartTime | : 10/8/2009 1:30:37 PM |
| EndTime | : 10/8/2009 1:31:00 PM |
| Status | : Passed |
| RunListId | : 9832 |
| ServerId | : 1 |
| Iterations | : 2 |
| ResultFile | : |
| TestParams | : conf_param1=x, conf_param2=y, conf_param3=z ... |
| Build | : 1 |
| Revision | : 1 |
| Version | : 1 |
| LogDir | : /logs/silver/test/MySqlOutputLog.zip |
| DbStat | : 256 |
| ExecutionInformation | : RedHat.Automation.Framework.ExecutionInfo |
| AncestorId | : -1 |

2. $subTests = Select-TestResult -AncestorId $pearent.Id $subTests are:

| | |
|---|---|
| Id | : 39291 |
| TestId | : -1 |
| Active | : True |
| Name | : Some_Benchmark_v1 |
| BaseTestName | : Some_Benchmark |
| ScriptName | : Some_Benchmark |
| ScriptLocation | : \\server\script_location |
| StartTime | : 10/8/2009 1:30:39 PM |
| EndTime | : 10/8/2009 1:30:51 PM |
| Status | : Passed |
| RunListId | : -1 |
| ServerId | : 1 |
| Iterations | : 1 |

```
ResultFile              :
TestParams              : conf_param1=z, conf_param2=y, conf_param3=z ...
Build                   : 1
Revision                : 1
Version                 : 1
LogDir                  : /logs/silver/test/TestStrArg_sub_data_a_2009-10-08 12-07-
19.633906004392031250.zip
DbStat                  : 256
ExecutionInformation    : RedHat.Automation.Framework.ExecutionInfo
AncestorId              : 39290

Id                      : 39292
TestId                  : -1
Active                  : True
Name                    : Some_Benchmark_v1
BaseTestName            : Some_Benchmark
ScriptName              : Some_Benchmark
ScriptLocation          : \\server\script_location
StartTime               : 10/8/2009 1:30:51 PM
EndTime                 : 10/8/2009 1:31:00 PM
Status                  : Passed
RunListId               : -1
ServerId                : 1
Iterations              : 1
ResultFile              :
TestParams              : conf_param1=z, conf_param2=y, conf_param3=z ...
Build                   : 1
Revision                : 1
Version                 : 1
LogDir                  : /logs/silver/test/TestStrArg_sub_data_b_2009-10-08 12-07-
31.633906004513437500.zip
DbStat                  : 256
ExecutionInformation    : RedHat.Automation.Framework.ExecutionInfo
AncestorId              : 39290
```

FIG. 3B (cont.)

PERFORMING DYNAMIC SOFTWARE TESTING BASED ON TEST RESULT INFORMATION RETRIEVED IN RUNTIME USING TEST RESULT ENTITY

RELATED APPLICATIONS

The present application is related to co-filed U.S. patent application Ser. No. 12/789,199 entitled "Mechanism for Dynamic Software Testing Using Test Entity" and U.S. patent application Ser. No. 12/789,248 entitled "Mechanism for Performing Dynamic Software Testing Based on Grouping of Tests Using Test List Entity", which are assigned to the assignee of the present application.

TECHNICAL FIELD

The embodiments of the invention relate generally to software testing and, more specifically, relate to performing dynamic software testing based on test result information retrieved in runtime using test result entity.

BACKGROUND

It is commonly known that administrative tasks include software testing various entities (e.g., software components, network protocols, etc.) using various script executing platforms (e.g., Windows PowerShell® platform) that use test execution scripts (e.g., PowerShell script) and are powered by extensible automated engines, such as PowerShell® invocation engine (e.g., System.Management.Automation.dll), and software frameworks (e.g., .NET framework). However, complications occur when testing is to be performed based on various (software and/or hardware) configuration settings, and the testing process becomes even more convoluted, and even unmanageable, when one or more configuration settings are to be modified. This is because today's testing solutions require testing team members (e.g., software developers) to build a test execution platform or infrastructure with multiple rules/regulations and configuration setting variants to accommodate each test and its corresponding hardware and software configuration settings, separately and independently, which, at best, requires constant supervision and rerunning of failed tests and, at worst, becomes overly complex and unmanageable. Further, to retrieve any relevant test result information, a testing system has to be stopped and a large number of rules and relationships have to be changed and saved which makes the retrieval process overly complex, convoluted, and unmanageable.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 3B illustrates a transaction sequence for performing runtime access and retrieval of test result information and performing dynamic testing using the retrieved result information according to one embodiment of the invention;

DETAILED DESCRIPTION

Figure 1:
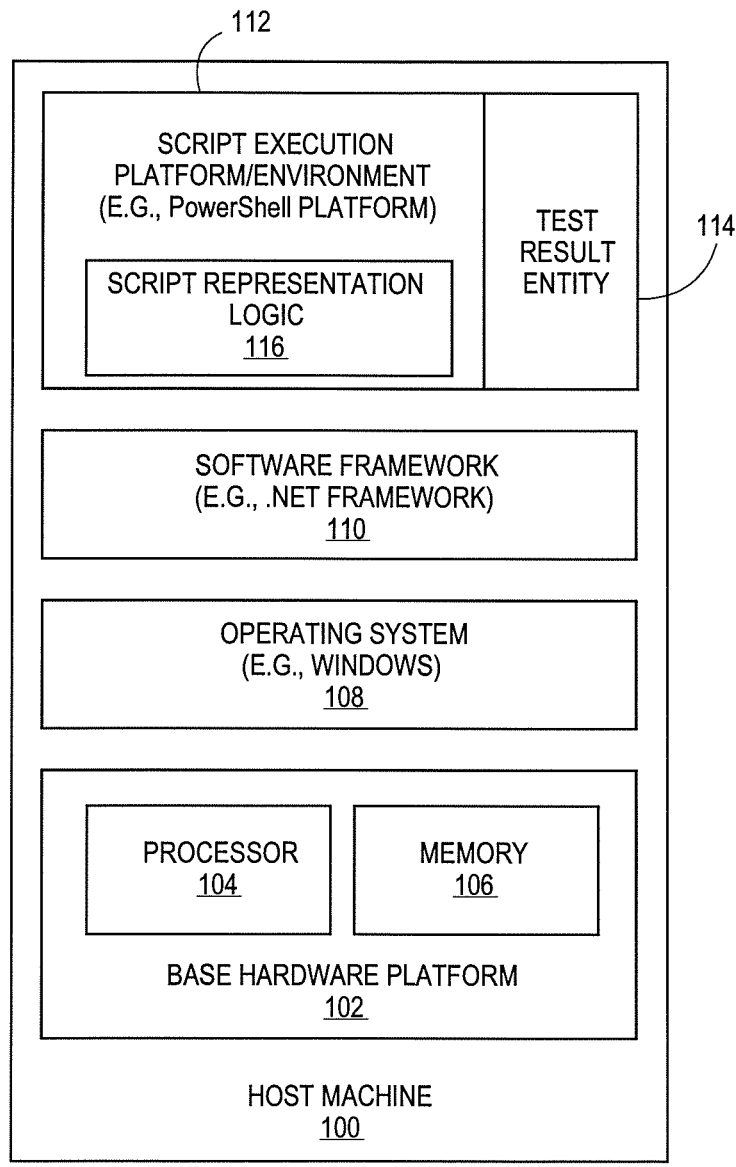
FIG. 1 illustrates a host machine for employing a test result entity for performing runtime access and retrieval of test result information and dynamic testing using the retrieved result information according to one embodiment of the invention.

Embodiments of the invention provide dynamic software testing based on test result information retrieved in runtime using test result entity. A method of embodiments of the invention includes causing a test execution script to run a first test to test a first component, and the test execution script is supported by a script execution platform on a computer system, and the first component depends on a second component. The method further includes retrieving, in runtime, testing information relating to the second component from a database, if the first test produces unsatisfactory results relating to performance of the first component, and causing, in runtime, the test execution script to run a second test to test the second component.

The embodiments of the invention are used to improve software testing by accessing and retrieving testing information relating to previously-run tests from a database for analysis in light of a currently-running test. This testing information may relate to software components that were previous versions of the current component that is being tested and/or part of a previous version of the current product (e.g., software package) to which the current component belongs and thus, these previous components are relevant to the software component that is part of the current version of the product and subject to the current test. Furthermore, for example, the retrieved testing information could be used to re-rerun the previously-run tests (of old version components) for troubleshooting purposes, etc. For example, if the current test results are not satisfactory and the user cannot determine whether the problem relates to the current component, the user may use new results from these rerun tests to determine whether this problem occurred in the previous version, whether another component of the software package is responsible for the problem, and the like. In one embodiment, test result entity serves as an interface between the script execution platform hosting the test execution script and the database from where testing information is retrieved and then used to run one or more tests based on the testing information using the test execution script. These one or more tests may be run consecutively or concurrently with the current test using, for example, separate threads (e.g., virtual machines). The runtime access and retrieval of testing information and then, in runtime, an immediate execution of relevant tests based on the retrieved test result information eliminates the need for each time stopping the testing system to access test result information from the database, building complex and unmanageable testing infrastructures to accommodate different configuration settings of the current and previously-run tests, and keeping track of changing rules and regulations which can make testing overly convoluted. Further, test result entity provides a unique comparison ability to compare test results from testing current components with results obtained from running previously-run tests relating to other relevant components.

Furthermore, in one embodiment, the test result entity provides the execution script the necessary ability to perform any number of tests with various modifying configuration settings. The configuration settings are modified in runtime and may include both hardware and software configuration settings. Any configuration setting modification is detected and accepted in runtime and the further, in runtime, the test entity enables the execution script to run or rerun a test based on the newly modified configuration settings. This smart testing is performed in runtime using the test result entity that eliminates the need for building a separate testing infrastructure each time a software or hardware configuration setting is modified.

FIG. 1 illustrates a host machine 100 for employing a test result entity 114 for performing runtime access and retrieval of test result information and dynamic testing using the retrieved result information according to one embodiment of the invention. Host machine 100 includes a base hardware platform 102 that comprises a computing platform, which may be capable, for example, of working with a standard operating system 108 (e.g., Microsoft® Windows®, Linux®, etc.). Operating system 108 serves as an interface between hardware or physical resources of the host machine 100 and a software framework 110 (e.g., Microsoft .NET® Framework). In some embodiments, base hardware platform 102 may include a processor 104, memory devices 106, network devices, drivers, and so on. Host machine 100 includes a server computer system and/or a client computer system (e.g., a client device).

Software framework 110 may provide features (e.g., user interface, database connectivity, network communication, etc.) allowing to address common programming problems and a virtual machine to manage the execution of software programs written for the software framework 110. Script execution platform or environment 112 (e.g., Windows® PowerShell®) supports a test execution script (e.g., PowerShell® script) and is built on software framework 110. Script execution platform 112 may include an extensible automation engine that includes a command-line shell and a corresponding test execution scripting language, such as PowerShell script. As aforementioned, script execution platform 112 is built on software framework 110 to provide an environment for the user (e.g., software developers/administrators) to perform local and remote administrative tasks (including software testing). Using the PowerShell script as a test execution script, these administrative tasks may be performed by execution of command-lets ("cmdlets") that are specialized classes (e.g., .NET classes) implementing a particular operation and are combined using scripts, which are composition of cmdlets and imperative logic, standalone applications, or by instantiating regular classes. For brevity and simplicity, PowerShell platform, PowerShell Script, .NET Framework, and Microsoft Windows are used as examples throughout this document.

Script execution platform 112 provides a hosting mechanism for the execution script that can be used by a user to produce and run software tests. For example, when testing a software component, the user defines certain properties (e.g., rules, regulations, script behavior, testing time limit, etc.) and software and/or hardware configuration settings relating to the test by inserting such properties and settings in the execution script prior to running the test. The user then initiates the test and the execution script runs the test according to the defined properties and configuration settings. In one embodiment, script representation logic 116 of script execution platform 112 provides logical script representation of testing (e.g., test scripts, test results, test history, hardware and/or software configuration information (both to be viewed and modified), etc.) shown as an example with reference to FIG. 3B. The user further uses the logical script representation to perform certain administrative tasks, such as amending test scripts, starting or stopping tests, modifying configuration settings, viewing and analyzing results, etc. In one embodiment, some or all of the testing information may be provided and the aforementioned administrative tasks can be performed using a Graphical User Interface (GUI)-based representation. Test entity 114 may serve as a database interface to access a database coupled to the host machine 100 for relevant testing information (e.g., test scripts, test results, test history, test statistics (such as pass/fail percentage) based on test history), and serve as a user interface to, in communication with script representation logic 116, provide access to logical script representation (as shown in FIG. 3B) or through a GUI-based representation.

Test result entity 114, in one embodiment, accesses and retrieves testing information, such as previously-run tests, their historical test results and statistics and their corresponding configuration settings, etc., in runtime such as without having to interrupt a running test or stop a testing system. These previous or historical test results and their corresponding configuration settings may be stored at a database which may be hosted by one or more storage devices coupled to host machine 100 directly or via a network (e.g., private or public network). Test result entity 114 goes beyond merely the current test or the current software component that is being tested and offers the additional ability to access and invoke other tests relating to other components according to their relationship to the current running test and/or the component that is being tested. Further, the retrieved test result information can be used to run/rerun the retrieved previously-run tests by enabling the test execution script to perform such task. Test result entity 114 provides an additional ability to compare the results of the current test with results from rerunning of other tests whose testing information is retrieved from database. This comparison technique can be used for troubleshooting the failed or underperformed current test running to test the current software component. This is further addressed in relation to subsequent figures.

Test result entity 114 further enables test execution script being hosted at script execution platform 112 to run and rerun various tests based on changing configuration settings (e.g., software or hardware configuration settings) in runtime. Test result entity 114 enables the test execution script to define itself, adjust itself, and decide its own behavior based on runtime-modification of hardware and/or software configuration settings relating to various tests. Test result entity 114, in one embodiment, uses a single configuration variant (as opposed to requiring a separate one for each test and/or hardware/software configuration setting) having the ability to dynamically adjust, in runtime, according to various test properties and the changing configuration settings. Test result entity 114 enables the test execution script to make decisions on how a test is to be executed by it so that the testing infrastructure may remain simplified and manageable (e.g., the execution script limits itself in focusing on the available resources to satisfy the current resting requirements). Test result entity 114 may provide an additional ability to, automatically, create test replications and run them with changing hardware/software configuration settings, in runtime, to provide the ability to compare results of different tests on multiple hardware/software configuration settings.

Throughout this document, the term "in runtime" at least refers to performing a task (e.g., modifying hardware or configuration settings, running or rerunning a test according to the modified configuration setting, accessing and obtaining test result information from a database, enabling an execution script at the script execution platform 112 to run/rerun a test based on the obtained test information, etc.) without pausing or stopping the testing system, such as without having to stop the execution script from running one or more tests that the execution script is in the process of running or build a complex text infrastructure to accommodate a modified configuration settings, or the like.

Figure 2A:
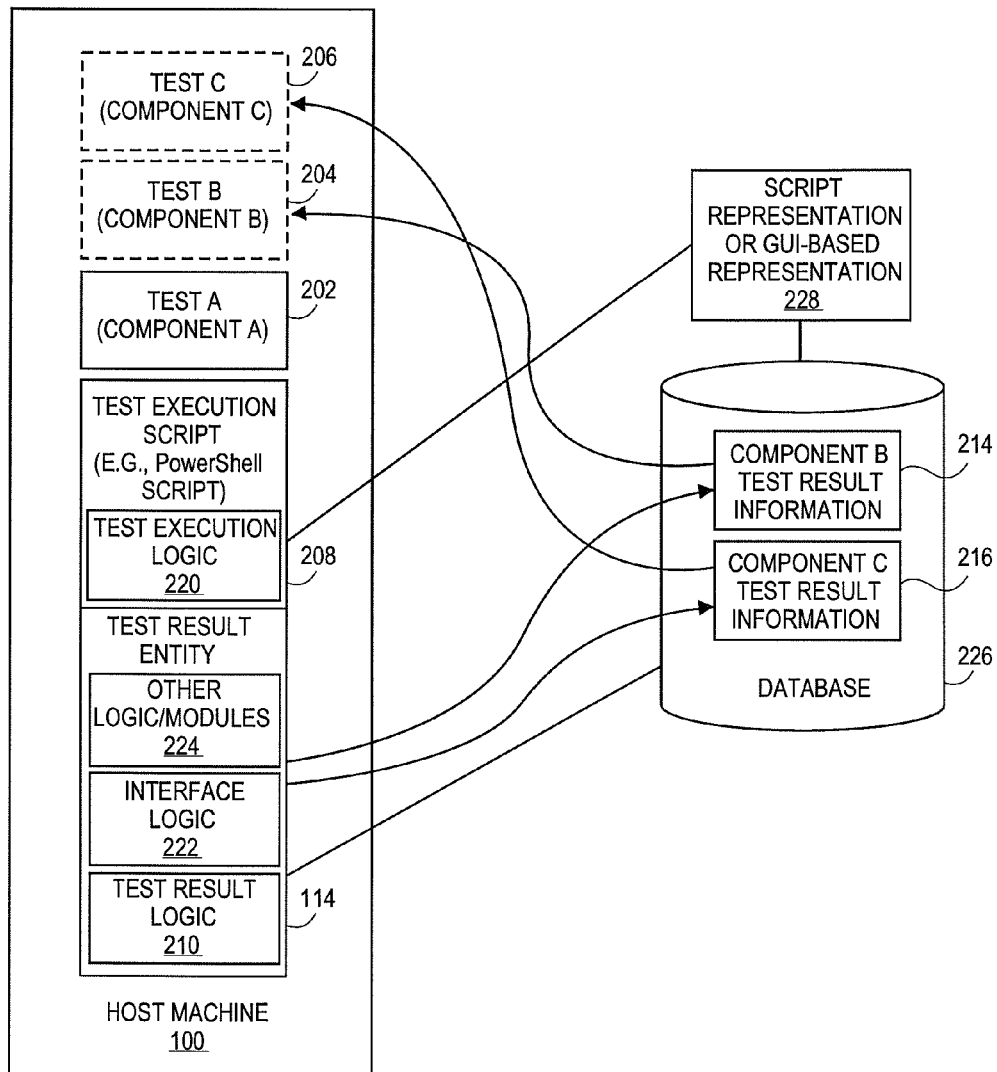
FIG. 2A illustrates a transaction sequence for performing runtime access and retrieval of test result information and performing dynamic testing using the retrieved result information according to one embodiment of the invention.

FIG. 2A illustrates a transaction sequence for performing runtime access and retrieval of test result information 214, 216 and performing dynamic testing using the retrieved result information 214, 216 according to one embodiment of the invention. In the illustrated embodiment, host machine 100 hosts test result entity 114 to enable the execution script 208 to run test A 202. For example, test A 202 is run based on configuration setting A to test component A of the current version of a product (e.g., software product, software package, software application, etc.). Now, let us suppose, test A fails or provides less than satisfactory results. At this point, the previously-known component dependency may be used to determine whether the fault (responsible for unsatisfactory results) lies with component A or something else, such as with another component of the product, etc. In one embodiment, the component dependency (e.g., does component A depend on or is influenced by another component?) may be predetermined by and known to the user prior to running test A. This dependency information (e.g., component A depends on component B and C) is inserted in the execution script prior to running test A 202).

For example, test A 202 to test component A of the current internal release version (e.g., version 3.0) of the product (e.g., software package/application) fails. The user may not know the exact reason for the failure, but suspects that the previous versions of the current component (that were successfully employed in the previous versions of the product) may provide a clue as to what might be the problem. In one embodiment, knowing the dependency of component A, such as knowing that components B and C represent previous versions of component A, the user may choose to retrieve testing information (e.g., test scripts, test results, test history, test statistics based on test history, etc.) relating to components B and C. In another embodiment, component B and C may not be previous versions of component A; rather, they are current components of that current version of the product that can influence component A, such as component A includes logic that depends on logic within components B and C. This way, the user can find out whether it is the logic within component B and C that needs to be changed for component A to be tested successfully. In yet another embodiment, component B represents a previous version of component A, while component C represents a current component that influences component A. With regard the illustrated embodiment, components B and C are regarded as previous versions of component A.

In one embodiment, test result entity 114 accesses and retrieves the relevant testing information 214, 216 of components B 214 and C 216 from database 226. Testing information 214, 216 may include previous tests, historical test statistics (e.g., overall results, specific performance statistics), hardware/configuration configuration settings, etc., relating to tests previously run for components B and C. In one embodiment, result entity 114 records the above information as testing information at database 226 when tests (e.g., tests A 202, B 204 and C 206) are run and this testing information can be accessed and retrieve later using test result entity 208. In one embodiment, test result logic 210 accesses and retrieves the relevant, but previously-run, test information 214, 216 from database 226, while interface logic 222 causes test result entity 114 to provide a database interface between the database 226 and the test execution platform hosting the test execution script 208 on host machine 100. These tasks may be performed in runtime. Interface logic 222 further causes test result entity 114 to provide a user interface with script representation (or GUI-based representation) 228.

The retrieved test information 214, 216 may then be used to run the two tests B-C 204-206 along with test A 202 by having the test result entity 114 enable the execution script 208 to run tests A 202, B 204 and C 206, concurrently or consecutively as requested by the user, according to their corresponding properties and configuration settings. In one embodiment, other logic/modules 224 includes test entity invocation logic (also referred to as "test logic" or "test invocation logic") to reference test execution logic 220 to enable the execution script 208 to run tests A-C 202-206 while dynamically adjusting to their different (and modifying) configuration settings.

In one embodiment, test result entity 114 further provides a unique ability (to the user) to compare test results of tests A-C 202-206 with each other (and with any previous results of testing components B and C as obtained from their test result information 214, 216). For example, if tests B-C 204-206 ran as they were expected to run (e.g., as if they were part of the current product), then the user may consider that there might be a problem with component A. On the other hand, if, like test A, one or both of tests B-C 204-206 failed or provided unsatisfactory results, then the problem might be with another one or more components within the current version of the product and the user may take appropriate steps to discover the component and fix the problem (including running or rerunning tests to test the suspected component(s)). There test result comparisons are mere examples, but it will be up to the user to decide how the actual test result comparisons are to be performed to obtain the best outcome. Further, it is contemplated that once the reason for failure (or less than satisfactory performance) of test A 202 in testing component A is determined, the user may take appropriate steps to solve the problem.

In one embodiment, test result entity 114, via test result logic 210, accesses and retrieves test information 214, 216 (from database 226), in runtime and on the fly, and references, via test entity invocation logic of other logic/modules 224, test execution logic 220 to enable test execution script 208 to run tests B 204 and C 206, consecutively or concurrently in any combination using, for example, separate threads (e.g., virtual machines), with test A 202 as well as any sub-tests or child-tests of parent tests B 204 and C 206 that may have been generated (e.g., by the user) while running parents tests B-C 204-206 and test A 202.

Figure 2B:
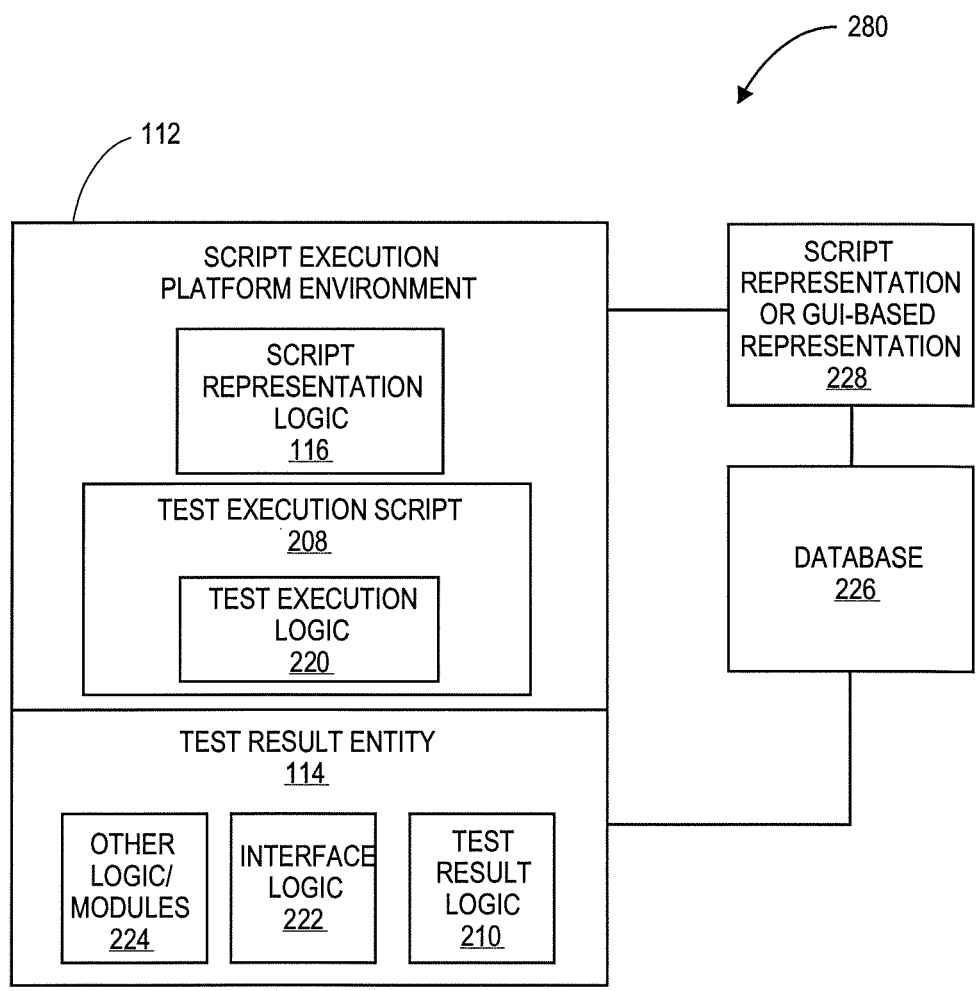
FIG. 2B illustrates a system employing a test result entity for performing runtime access and retrieval of test information and dynamic testing using the retrieved information according to one embodiment of the invention.

FIG. 2B illustrates a system 280 employing a test result entity 114 for performing runtime access and retrieval of test information and dynamic testing using the retrieved information according to one embodiment of the invention. This illustration is a simplified block diagram of the system 280 employing test entity 114 and other relevant components to perform various tasks as discussed in FIG. 2A. System 280 (e.g., host machine including server computer system and/or client computer system) running on a standard operating system (e.g., Linux, Windows, etc.), includes a script execution platform or environment 112 (e.g., PowerShell platform), built on a software framework (e.g., .NET Framework), supporting a test execution script 208 (PowerShell script). Script execution platform 112 includes script representation logic 116 to provide a script representation of testing information (e.g., test scripts, test history, test statics, hardware and/or software configuration settings, etc.) for the user to access, analyze, and manipulate. Script representation 228 is provided via a host machine that includes a server machine and/or a client machine (e.g., client device). In one embodiment, testing and other relevant information are provided using a GUI-based representation (as opposed to script representation 228) and GUI-based logic (as opposed to script representation logic 116).

Script execution script includes test execution logic 220 to facilitate execution of tests. Test result entity 114 includes other logic and modules 224 including test entity invocation logic that works in communication with test execution logic 220 to execute tests (such as by having test entity invocation logic referencing test execution logic 220) regardless of changes (including runtime modifications) made to software and/or hardware configuration settings. Other logic or modules 224 may include test list logic for performing listing or grouping of tests, etc. Interface logic 222 enables test entity to provide a user interface to script representation (or GUI-like representation) and further provide a data interface to database 226 that stores testing information.

Test result entity 114 accesses and retrieves, in runtime, testing information from database 226. This testing information includes information relate to previously-run tests of other components (or other versions of the current component) and, via test result entity, the retrieved testing information is used to re-executed the previously-run tests, in runtime, using test execution script 208. Test result entity 114 further provides a unique ability to compare the results of the current test testing the current component and these re-executed tests testing other components. Testing information as well as results of various tests may be provided via a script representation as provided using script representation logic 116. In one embodiment, script representation may be substituted for a GUI-based representation 228 using GUI logic in lieu of script representation logic 116.

Test result entity 114 provides, by having test entity invocation logic of other logic/modules 224 referencing test execution logic 220, test execution script 208 the ability to run these tests not only in accordance with their initial configuration settings, but also in accordance with their modified configuration settings (if any) in runtime. In one embodiment, an abstraction layer for test result entity 114 is achieved by providing a "setup" argument in an execution constructor of test execution logic 220. Test result entity 114 may have a number of execution overloads. The setup parameter of test result entity 114 is an execution parameter that represents different physical devices (which may have different hardware profiles) on which the test execution script 208 is executed. Test result entity 114 does not include an execution script; rather, it references the test execution script 208 that acts as a black-box so none of the script changes influence test result entity 114. In one embodiment, other logic/modules 224 include test entity invocation logic that references the test execution logic 220 to (re)run tests by dictating various new and modified (hardware and/or software) configuration settings to the test execution logic 220 (that are passed to it) through command-line arguments and/or configuration objects.

Modifying or using different hardware configuration settings could be of any nature, such as two computer systems having different processors (e.g., using a 1 GHz processor as opposed to using a 2 GHz processor), memory sizes (e.g., using a 256 MB Random Access Memory (RAM) as opposed to using a 512 MB RAM), etc. Examples of modifying or using different software configuration settings may include changing or modifying any number of software components of the product being tested or other software applications running on the host machine, changing virtual machine speed, number of virtual machines in iteration, using different operating systems for the same test, etc.

Test result entity 114 further includes interface logic 222 to provide a user interface to script representation 228 and a database interface to database 226. Database 226 may include relevant test information, such as tests scripts of previously-run tests of other components or previous version of the current component that is being currently tested, test history, test statistics based on test history, previous hardware and/or software configuration settings, etc.

Software testing involving test result entity 114 includes software testing of any nature, such as ranging from testing modules and components of a software application to testing complex and large-scale benchmarks, network scalability, internal releases of products (e.g., software package), antivirus scan loading, time drifting, user performance-related components, etc. Further, these tests can be performed for any number of reasons, such as investigating performance issues, performing load/stress testing, investigating regression issues relating to different product versions, etc. As an example, these testing techniques can be used to test a number of aspects of Red Hat Enterprise Virtualization (RHEV) products.

Figure 3A:
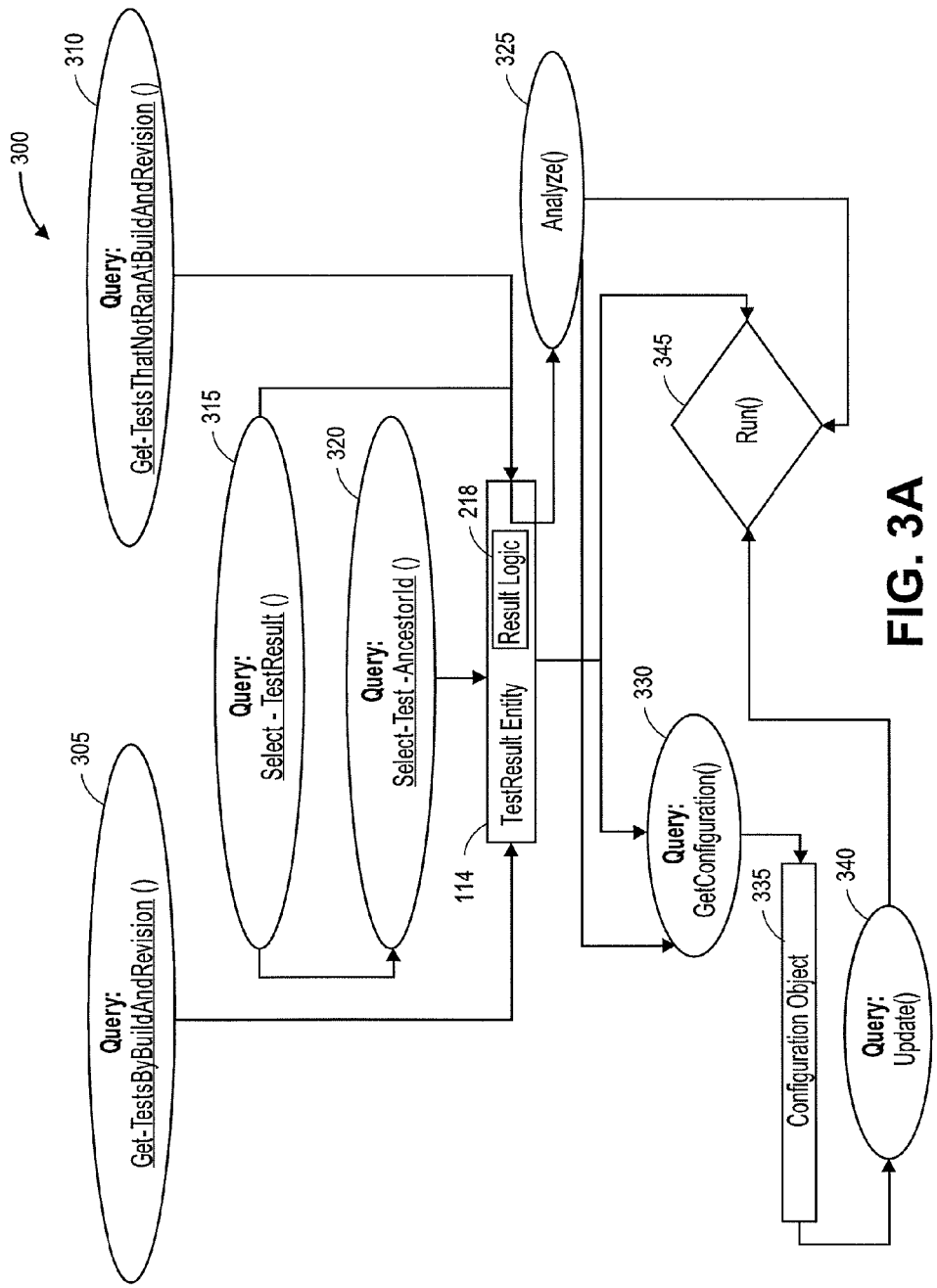
FIG. 3A illustrates a method for performing runtime access and retrieval of test result information and performing dynamic testing using the retrieved result information according to one embodiment of the invention.

FIG. 3A illustrates a method for performing runtime access and retrieval of test result information and performing dynamic testing using the retrieved result information according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by test result entity of FIG. 1.

Method 300 begins at block 305 with the querying tests by build and revision. The term "build" relates to interval releases or versions of a product before the product is released to the public, while the term "revision" refers to changes or revisions made to the build; for example, each build may have several revisions. At block 310, a query is performed for those tests that are not build and revision, such as a test that did not run on a previous version of the product and is limited to its current version. At block 315, previous test results are queried. For example, test results for a previously-run test that is relevant to or the same as the ones requested in block 305 and 310 is requested. At block 320, the ancestor identification for the requested previously-run test is selected.

In one embodiment, test result entity 114 access and retrieve, in runtime, any relevant test result information (e.g., including test results, historical test statistics, properties and configuration settings, etc.) of the requested tests from a database that may be remote and is coupled to the host computer system where test result entity 114 is installed. The retrieved test result information is analyzed at block 325. The findings of this analysis may be used to perform a range of decisions, such as whether there is a need to rerun any of the previously-run tests, whether any of the current hardware or software configuration setting should be modified, etc. If, for example, a configuration setting is to be modified, at block 330, using configuration object 335, the (hardware and/or software) configuration settings are modified and updated at block 340. At block 345, test result entity 114 enables, in runtime and immediately, the test execution script to run additional tests based on the retrieved test result information along with the current test that is being run. Any number of these tests may run with default and/modified configuration settings.

FIG. 3B illustrates a transaction sequence for performing runtime access and retrieval of test result information and performing dynamic testing using the retrieved result information according to one embodiment of the invention. Block 352, which parallels block 305 of FIG. 3A, illustrates initiating Get-RestsByBuildAndRevision to retrieve or return those tests that were executed at, for example, build X and revision Y, where the returned list of test objects is shown in block 352 and it further shows all tests that ran on the specified build and revision and how many times each test ran and whether (and the number of times) each test failed or passed. Block 354 parallels block 310 of FIG. 3A and initiates Get-TestsThatNotRanAtBuildAndRevision that shows the tests that did not run on the specified build and revision or the number of times each test ran in general. Block 356 illustrates Select-Test-Name-Id-Build-Revision and block 358 illustrates Select-Test-AncestorId paralleling to block 315 and 320, respectively, of FIG. 3A.

Figure 4:
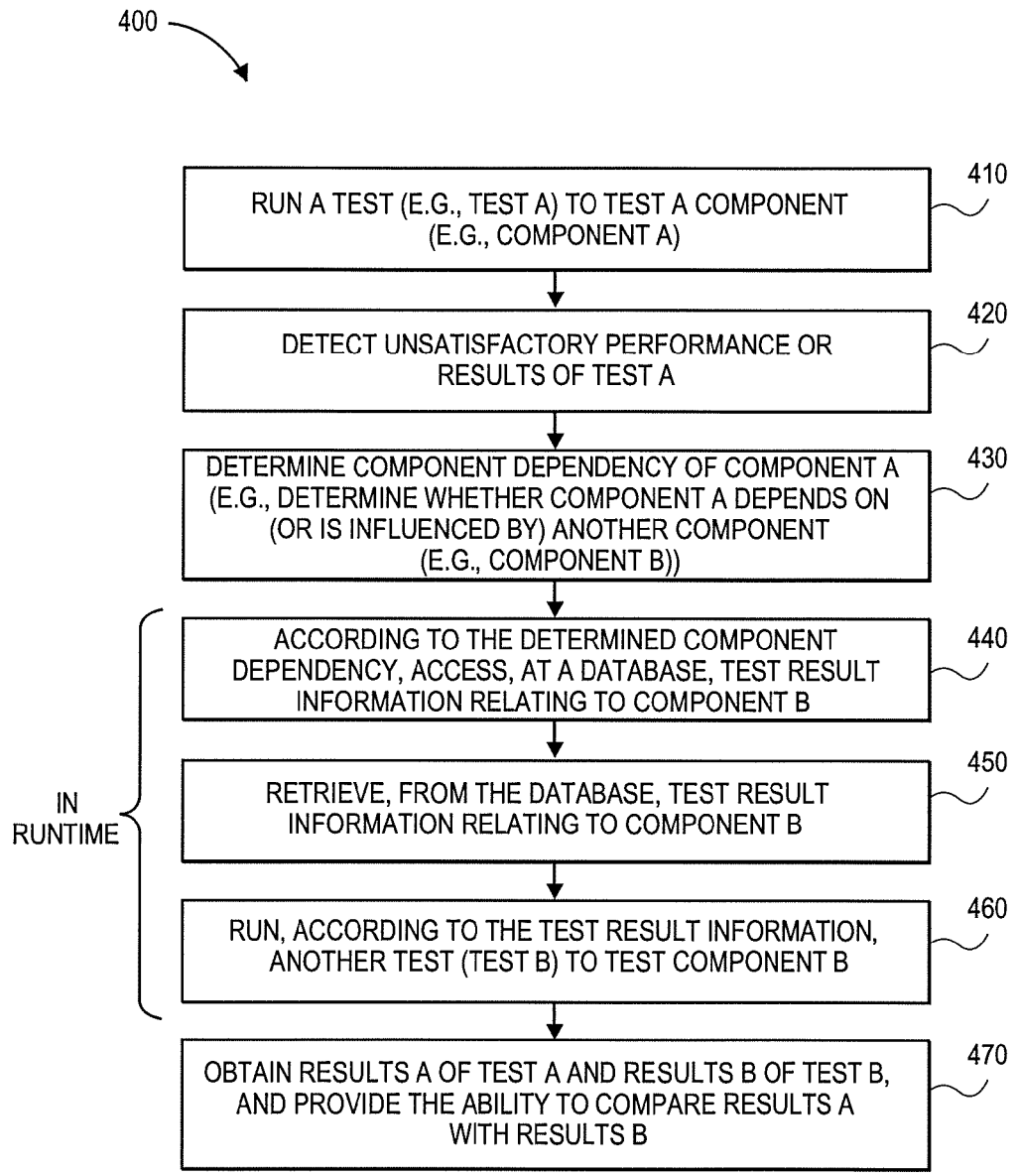
FIG. 4 illustrates a method for performing runtime access and retrieval of test result information and performing dynamic testing using the retrieved result information according to one embodiment of the invention.

FIG. 4 illustrates a method for performing runtime access and retrieval of test result information and performing dynamic testing using the retrieved result information according to one embodiment of the invention. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by test result entity of FIG. 1.

Method 400 begins at block 410 where, for example, a test (e.g., test A) is run to test a particular software component (e.g., component A). At block 420, testing information including results of the test (and other testing information as described throughout this document) are detected, stored on a database and deemed as a failure or less-than-satisfactory. At block 430, component dependency of component A is determined, such as whether component A depends on another component (e.g., component B) or even a previous version of itself, and whether retesting/reevaluating of the dependent component B can tell the user whether the problem that caused less-than-satisfactory results is due to being something wrong with component A or another similar relevant component (including component B) or entirely another entity of the product. It is contemplated that in the absence of component dependency, the user may seek an appropriate solution for improving the less-than-satisfactory results. In this illustrate, however, component A depends on component B which was previously run and the results of its previous test (including the test, historical statistics, configuration settings, etc., are at a database).

In one embodiment, test result entity works as an interface and accesses, in runtime, the relevant testing information relating to component B at the database at block 440. Now, let us suppose, the user wishes to rerun the previous component B test. At block 450, test result entity retrieves, in runtime, the accessed testing information relating to component B from the database and enables the execution script running test A at the host machine to run another test (test B) to test component B (which may be based on entirely different hardware and/or software configuration settings than those used for running test A to test component A) at block 460. Testing information may include test scripts of previously-run tests to test component B, their test history and statistics, their hardware and/or software configuration settings, etc. The two tests can be run simultaneously, immediately, and without stopping test A from running, if it is running. At block 470, results of the two tests A and B are obtained, which can then be used for comparison in any number of ways (e.g., comparing results of test A with results of test B, new results of test B with its previous results, results from a previously run to test B with the current results of test B, etc.) to determine the cause of failure or less-than-satisfactory results for test A so that an appropriate solution to fix the problem can be found and implemented. In one embodiment, a graphical user interface (GUI)-based application may be provided to the user to initiate a number of tasks, such as initiating test runs, obtaining and comparing test results, etc.

Figure 5:
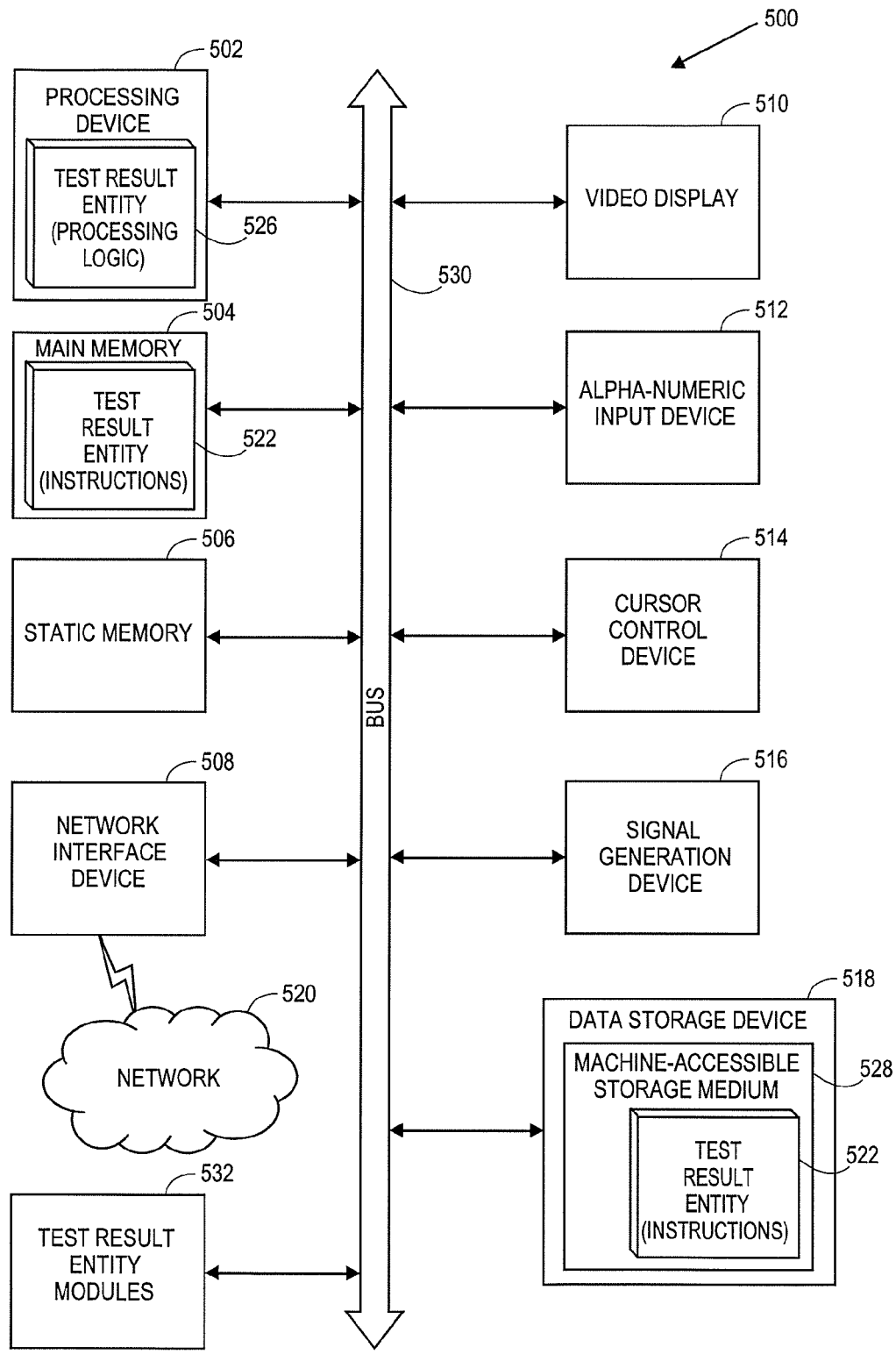
FIG. 5 is a block diagram illustrating one embodiment of a computer system.

FIG. 5 illustrates computer system 500 for performing runtime access and retrieval of test result information and performing dynamic testing using the retrieved result information according to one embodiment of the invention. Within the computer system 500 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, random access memory (RAM), dynamic RAM (DRAM) such as synchronous DRAM (SDRAM), DRAM (RDRAM), etc.), a static memory 506 (e.g., flash memory, static random access memory (SRAM), etc.), and a secondary memory 518 (e.g., a data storage device in the form of a drive unit, which may include fixed or removable machine-accessible or computer-readable storage medium), which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic 526 for performing the operations and methods discussed herein.

The computer system 500 may further include a network interface device 508. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 516 (e.g., a speaker).

The data storage device 518 may include a machine-accessible storage medium (or a computer-readable storage medium) 528 on which is stored one or more sets of instructions 522 (e.g., test result entity) embodying any one or more of the methodologies or functions described herein. The test result entity may also reside, completely or at least partially, within the main memory 504 (e.g., test result entity (instructions) 522) and/or within the processing device 502 (e.g., test result entity (processing logic) 526) during execution thereof by the computer system 500, the main memory 504 and the processing device 502 also constituting machine-readable storage media. Further, for example, the test result entity instructions 522 may be transmitted or received over a network 520 via the network interface device 508.

The machine-readable storage medium 528 may also be used to store the test result entity (instructions) 522 persistently. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Test result entity modules 532, components and other features described herein (for example in relation to FIG. 1) can be implemented as discrete hardware components or integrated in the functionality of hardware components such as ASICS, FPGAs, DSPs or similar devices. In addition, the modules 532 can be implemented as firmware or functional circuitry within hardware devices. Further, the modules 532 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "causing", "running", "detecting", "determining", "accessing", "retrieving", "running", "obtaining", "providing", "querying", "setting", "selecting", "modifying", "performing", "analyzing", "updating", "enabling", "storing", "saving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:

causing, by a processing device, a test execution script to execute a first test to test a first component, wherein the test execution script is supported by a script execution platform on a computer system, wherein the first component depends on a second component;

when the first test produces unsatisfactory results relating to performance of the first component, accessing, in runtime of the test execution script, testing result information relating to the second component from which the first component depends, the testing results information accessed at a database coupled with the computer system, wherein the testing result information comprises at least one of a previously-run test, previously-run test results, historical statistics relating to the previously run test, properties, or configuration settings relating to the second component;

when a determination is made to rerun testing for the second component in view of the accessed testing result information, retrieving, in the runtime of the test execution script, the accessed testing result information relating to the second component from the database; and causing, by the processing device in the runtime of the test execution script, the test execution script to execute, according to the retrieved testing result information relating to the second component, a second test to test the second component;

wherein the first test is executed in view of a first configuration setting at a same time as the second test is executed in view of a second configuration setting.

2. The method of claim 1, further comprising detecting the unsatisfactory results relating to the first component.

3. The method of claim 1, further comprising comparing first test results of the first test and second test results of the second test for analysis to improve the performance of the first component.

4. The method of claim 1, wherein the testing result information is provided as a logical script representation.

5. The method of claim 4, wherein the logical script representation provides services to a user of the computer system, the services comprising at least one of amending the test execution script, starting the first test or the second test, stopping the first test or the second test, modifying the first configuration setting or the second configuration setting, viewing the testing result information, or analyzing the testing result information.

6. A system comprising:

a memory;

a processing device communicably coupled to the memory;

a script execution environment executable from the memory by the processing device, the script execution environment comprising a test execution script; and a test result entity executable from the memory by the processing device and communicably coupled to the script execution environment, wherein the test result entity is to:

cause the test execution script to execute a first test to test a first component that depends on a second component;

when the first test produces unsatisfactory results relating to performance of the first component, access, in runtime of the test execution script, testing result information relating to the second component from which the first component depends, the testing results information accessed at a database coupled with the computer system, wherein the testing result information comprises at least one of a previously-run test, previously-run test results, historical statistics relating to the previously run test, properties, or configuration settings relating to the second component;

when a determination is made to rerun testing for the second component in view of the accessed testing result information, retrieve, in the runtime of the test execution script, the accessed testing result information relating to the second component from the database; and cause, in the runtime of the test execution script, the test execution script to execute, according to the retrieved testing result information relating to the second component, a second test to test the second component;

wherein the first test is executed in view of a first configuration setting at a same time as the second test is executed in view of a second configuration setting.

7. The system of claim 6, further comprising logic coupled to the script execution environment to detect the unsatisfactory results relating to the first component.

8. The system of claim 6, wherein the test result entity is further to facilitate comparing first test results of the first test and second test results of the second test for analysis to improve the performance of the first component.

9. The system of claim 6, wherein the testing result information is provided as a logical script representation.

10. The system of claim 9, wherein the logical script representation provides services to a user of the system, the services comprising at least one of amending the test execution script, starting the first test or the second test, stopping the first test or the second test, modifying the first configuration setting or the second configuration setting, viewing the testing result information, or analyzing the testing result information.

11. A non-transitory machine-readable storage medium including data that, when accessed by a processing device, cause the processing device to perform operations comprising:

causing, by the processing device, a test execution script to execute a first test to test a first component, wherein the test execution script is supported by a script execution platform on a computer system, wherein the first component depends on a second component;

when the first test produces unsatisfactory results relating to performance of the first component, accessing, in runtime of the test execution script, testing result information relating to the second component from which the first component depends, the testing results information accessed at a database coupled with the computer system, wherein the testing result information comprises at least one of a previously-run test, previously-run test results, historical statistics relating to the previously run test, properties, or configuration settings relating to the second component;

when a determination is made to rerun testing for the second component in view of the accessed testing result information, retrieving, in the runtime of the test execution script, the accessed testing result information relating to the second component from the database; and causing, by the processing device in the runtime of the test execution script, the test execution script to execute, according to the retrieved testing result information relating to the second component, a second test to test the second component;

wherein the first test is executed in view of a first configuration setting at a same time as the second test is executed in view of a second configuration setting.

12. The non-transitory machine-readable storage medium of claim 11, further having instructions that, when executed, cause the processing device to detect the unsatisfactory results relating to the first component.

13. The non-transitory machine-readable storage medium of claim 11, further having instructions that, when executed, cause the processing device to compare first test results of the first test and second test results of the second test for analysis to improve the performance of the first component.

14. The non-transitory machine-readable storage medium of claim 11, wherein the testing result information is provided as a logical script representation.

15. The non-transitory machine-readable storage medium of claim 14, wherein the logical script representation provides services to a user of the computer system, the services comprising at least one of amending the test execution script, starting the first test or the second test, stopping the first test or the second test, modifying the first configuration setting or the second configuration setting, viewing the testing result information, or analyzing the testing result information.

* * * * *